United States Patent [19]
Washikawa et al.

[11] Patent Number: 5,862,106
[45] Date of Patent: Jan. 19, 1999

[54] OPTICAL DISC REPRODUCING APPARATUS AND OPTICAL DISC REPRODUCING METHOD

[75] Inventors: Sakae Washikawa, Chiba; Taiji Noshitani; Tetsuya Yamamoto, both of Tokyo, all of Japan

[73] Assignee: Sony Corporation, Tokyo, Japan

[21] Appl. No.: 849,216

[22] PCT Filed: Oct. 14, 1996

[86] PCT No.: PCT/JP96/02970

§ 371 Date: Jun. 10, 1997

§ 102(e) Date: Jun. 10, 1997

[87] PCT Pub. No.: WO97/14148

PCT Pub. Date: Apr. 17, 1997

[30] Foreign Application Priority Data

Oct. 13, 1995 [JP] Japan ................................. 7-265948

[51] Int. Cl.$^6$ ................................................ G11B 17/22
[52] U.S. Cl. ................................................ 369/32; 369/58
[58] Field of Search .................................. 369/32, 58, 54, 369/47, 59, 60, 49, 44.32, 53, 48, 13

[56] References Cited

U.S. PATENT DOCUMENTS

| 5,012,461 | 4/1991 | Yoshida et al. | 369/44.33 |
| 5,392,265 | 2/1995 | Takezawa | 369/32 |
| 5,418,762 | 5/1995 | Kitayama | 369/13 |
| 5,473,590 | 12/1995 | Yokota et al. | 369/59 |

FOREIGN PATENT DOCUMENTS

| 3120666 | 5/1991 | Japan . |
| 5224581 | 9/1993 | Japan . |

Primary Examiner—Ali Neyzari
Attorney, Agent, or Firm—Jay H. Maioli

[57] ABSTRACT

An optical disc reproducing apparatus and an optical disc reproducing method are adapted to use, as a medium for reproduction, an optical disc on which audio signals are recorded to repeat such an operation to control a read-out system by a signal indicating loop reproduction to move read-out position of data to a position traced back in time by a predetermined number of tracks to carry out reproduction up to the position where execution of loop is started to move the read-out position to the position traced back therefrom. Thus, effects similar to the scratch rendition of the record disc of an analog system can be provided.

14 Claims, 3 Drawing Sheets

OPTICAL DISC REPRODUCING APPARATUS AND OPTICAL DISC REPRODUCING METHOD

TECHNICAL FIELD

This invention relates to an optical disc reproducing apparatus and an optical disc reproducing method for reproducing audio signals from the optical disc.

BACKGROUND ART

For an optical disc, there is a Compact Disc (hereinafter referred to as CD) adapted so that, e.g., audio signals are recorded as pit trains in a spiral form from the inner circumference toward the outer circumference on one side surface of the disc. The CD player or the disc player serves to irradiate laser beams onto the pit trains by using the optical pick-up while allowing such a CD to undergo rotational drive at a constant linear velocity to detect changes of light quantity of a reflected light thereof to reproduce the audio signals.

On the other hand, as a medium for recording audio signals, there is a record disc of the analog system (type) adapted so that sound grooves corresponding to stresses of sounds are provided in a spiral form from the outer circumference to the inner circumference of the disc of vinyl resin to thereby record respective audio signals as an analog signal. The record player of the analog system serves to rotate the record disc mounted on a turn table rotating at a constant angular velocity to trace these sound grooves by means of the reproduction needle to detect vibrations of the reproduction needle thus to reproduce audio signals.

Meanwhile, a style of rendition called scratch using a record disc and a record player as described above is known. In accordance with such rendition, e.g., in the field of dance music, a disc jockey repeats several times such an operation to control, by hand, rotation of the record disc rotating on the turn table to rotate the record disc by several centimeters in a backward rotational direction, and then to subsequently rotate it in the forward rotational direction to rotate it in the backward rotational direction for a second time.

Sound reproduced by this scratch essentially consists of noise generated as the result of the fact that the reproduction needle traces the sound grooves in a direction opposite to the reproduction direction when the record disc is rotated in a backward direction, and short phrase when the record disc is rotated in a forward direction and is returned therefrom. As the result of the fact that combinations of noises and short phrases as described above are repeated several times, peculiar rhythms are generated. Rhythms produced by this scratch constitute important element which is indispensable for the specific dance music.

Meanwhile, the above-described CD is chucked on the CD player. When the pick-up is placed (located) at the innermost circumference, the CD is rotated at about 600 revolutions per minute (r.p.m.), and when the pick-up is placed (located) at the outermost circumference, the CD is rotated at about 200 r.p.m. This number of revolutions corresponds to a value about 18 times to 6 times greater than the number of revolutions of the ordinary record player of the analog system.

It is impossible to carry out the scratch rendition by controlling rotation by hand, similarly to the record disc, with respect to the CD rotating at a high speed in the state chucked on the CD player as described above. However, also in the CD player, there is strong demand for realization or performance of scratch rendition.

In view of the above, an object of this invention is to provide an optical disc reproducing apparatus and an optical disc reproducing method which can obtain similar effects as in the scratch rendition of the record disc.

DISCLOSURE OF THE INVENTION

An optical disc reproducing apparatus according to this invention is directed to an apparatus for irradiating laser beams onto an optical disc on which audio signals and absolute address data are recorded in a spiral form or in a concentric form from the inner circumference toward the outer circumference to read a reflected light thereof to thereby reproduce data, the apparatus comprising: data read-out means including an object lens (objective) for converging laser beams onto a point on the optical disc and an actuator for moving the object lens in a direction in parallel to the optical axis of the laser beams and in a radial direction of the disc; memory means for storing the absolute address data which have been read out from the optical disc by the read-out means; and control means operative so that when setting of loop reproduction is carried out, it allows memory means to store the absolute address data thereinto to control the actuator to move the laser beams in an inner circumferential direction to start read-out operation by the read-out means from a position (location) traced back in point of time of the audio signal to move the laser beams to the position traced back in point of time for a second time at the time point when the absolute address (indicated by the absolute address data) thus read out becomes in correspondence with the absolute address (indicated by the absolute address data) stored in the memory means.

Moreover, an optical disc reproducing method according to this invention is directed to a method of reproducing data of an optical disc on which audio signals and absolute address data are recorded in a spiral form or in a concentric form, the method comprising: a step of irradiating laser beams onto the optical disc in a manner focused on a point thereon to read out data recorded on the optical disc by a reflected light thereof; and a step such that when setting of loop reproduction is carried out, a procedure is taken to allow memory means to store the absolute address data thereinto to start read-out operation from a position (location) traced back in point of time of the audio signal to move the laser beams of read-out means to the position traced back in point of time for a second time at the time point when absolute address (indicated by the absolute address data) thus read out becomes in correspondence with absolute address (indicated by the absolute address data) stored in the memory means.

In addition, an optical disc reproducing method according to this invention is directed to a method of reproducing data of an optical disc on which audio signals and absolute address data are recorded in a spiral form or in a concentric form, the method comprising: a step of irradiating laser beams onto the optical disc in a manner focused on a point thereon to read out data recorded on the optical disc by a reflected light thereof; a step such that when setting of loop reproduction is carried out, a procedure is taken to allow memory means to store the absolute address data thereinto to start read-out operation by read-out means from a position (location) traced back in point of time of the audio signal; a step of moving the laser beams of the read-out means to the position traced back in point of time for a second time at the time point when the absolute address (indicated by the absolute address data) thus read out becomes in correspondence with the absolute address (indicated by the absolute address data) stored in the memory means during setting of the loop reproduction to repeatedly carry out read-out operation; and a step such that when setting of the loop reproduction is released, a procedure is taken to select any one of the stored absolute address and a location in which address quantity corresponding to a predetermined time is added with respect to the stored absolute address to start read-out operation thereof.

By using the optical disc reproducing apparatus and the optical disc reproducing method featured as describe above, the optical disc is used, thus making it possible to obtain similar effects as in the case of the scratch rendition of the record disc of the analog system.

BEST MODE FOR CARRYING OUT THE INVENTION

Preferred embodiments of this invention will now be described in detail with reference to the attached drawings.

In one embodiment, this invention is applied to a CD player using, as a recording medium, a compact disc (hereinafter referred to as CD) on which audio signals, e.g., musical pieces (composition), etc. are recorded.

Figure 1:
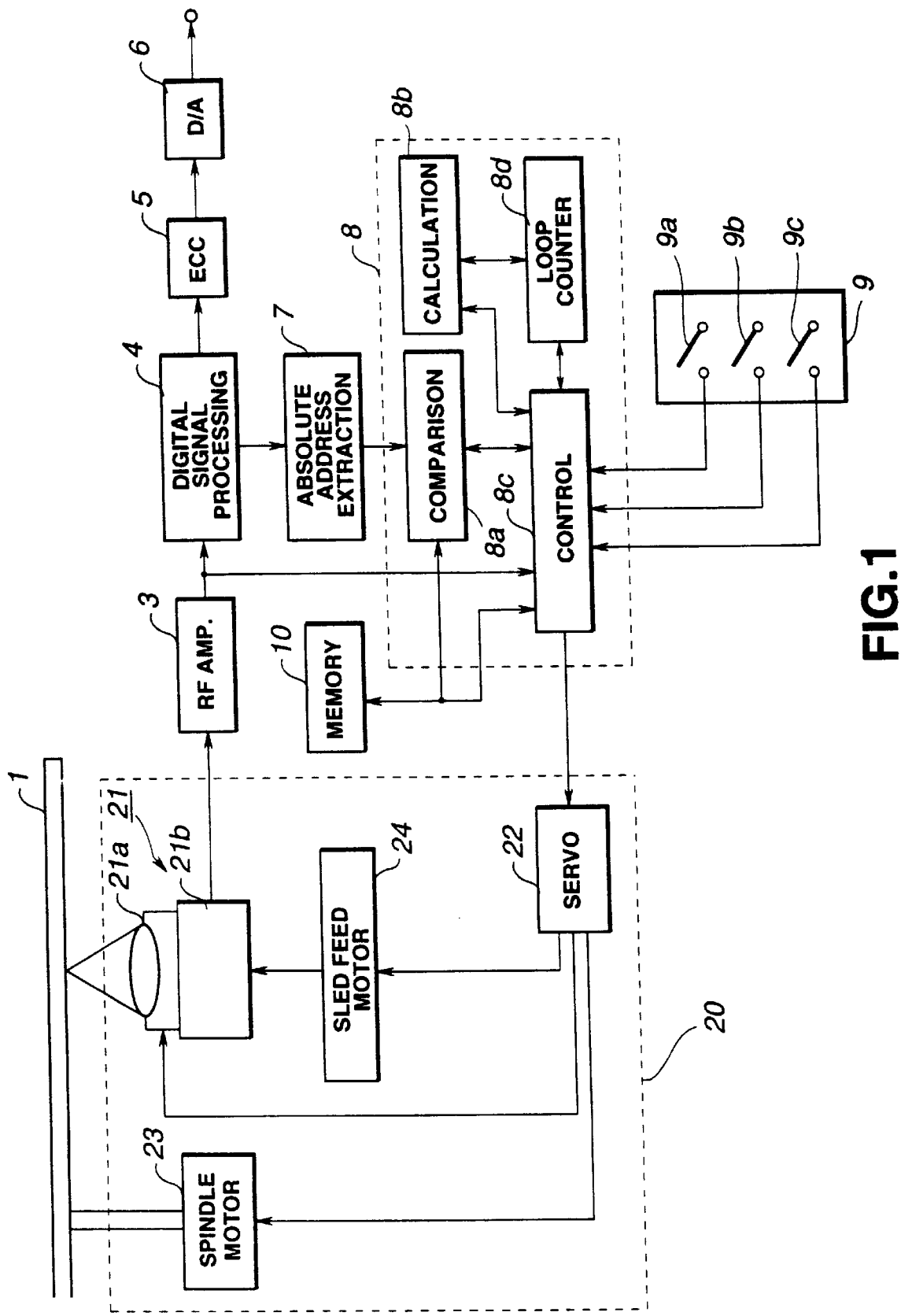
FIG. 1 is a block diagram showing the configuration of a CD player to which this invention is applied.

This CD player comprises, as shown in FIG. 1, for example, a signal read-out section 20 for reading out signals from a CD1 on which audio signals are recorded, a RF amplifier 3 for amplifying the signal that the signal read-out section 20 has read out to reproduce data, a digital signal processing section 4 for separating subcode, etc. which will be described later from the reproduced data, an absolute address extracting section 7 for extracting absolute address which will be described later from the separated signal, a system control section 8 for controlling ordinary reproduction or loop reproduction which will be described later, etc., and an operation section 9 whereby user carries out a desired operation.

On the other hand, on the CD1 used as a recording medium in this CD player, audio signals quantized into 16 bits, and error correction codes for carrying out error correction at the time of reading out the audio signal, etc. are recorded as trains of pits (hereinafter referred to as tracks) which are concave or recess having depth of about 0.1 µm in a spiral form from the inner circumference toward the outer circumference, e.g., every frame which is the minimum unit of data. In this case, the pitch between adjacent tracks is caused to be 1.6 µm.

Further, at the leading portion of the frame, data indicating music number, beginning of music and length of music from the start to the end of music, and subcodes such as absolute address, etc. are also recorded. This absolute address indicates elapsed time from the starting time of the first music caused to be set to 0 (zero) by min., sec. and frame number.

The ordinary reproduction operation of the optical disc reproducing apparatus will now be described.

The signal read-out section 20 reads out a signal recorded on the CD1 under control of the system control section 8 to deliver the RF signal thus read out to the RF amplifier 3. The RF amplifier 3 amplifies the RF signal delivered from the signal read-out section 20, and delivers reproduction data obtained by binarizing the RF signal to the digital signal processing section 4. The digital signal processing section 4 separates, from the reproduction data, audio signal, error correction code and subcode, etc. to deliver the audio signal and the error correction code to an ECC circuit 5. This ECC circuit 5 corrects any error of the audio signal by using the error correction code to deliver the corrected audio signal thus obtained to a D/A converter 6. The D/A converter 6 converts the audio signal in digital form into an analog signal to output this audio signal in the analog form to an amplifier and/or speaker (not shown) through an output terminal.

The ordinary reproduction operation of this CD player will now be described in more practical sense.

The signal read-out section 20 comprises, as shown in the above-mentioned FIG. 1, an optical pick-up 21 for irradiating laser beams onto the CD1 to read out a signal recorded on the CD1 by a reflected light thereof, a servo circuit 22 for driving an actuator, etc. which will be described later, a spindle motor 23 for rotationally driving the CD1, and a sled feed motor 24 for driving the optical pick-up 21 in the radial direction of the CD1.

For example, when an input signal from a reproduction button (not shown) of the operation section 9 is delivered to the system control section 8, the system control section 8 controls the servo circuit 22. Thus, the servo circuit 22 drives the spindle motor 23 to rotationally drive the CD1 so that the linear velocity becomes constant. Further, the servo circuit 22 drives the sled feed motor 24 under control of the system control section 8 to move the optical pick-up 21 to a predetermined position opposite to the recording surface of the CD1, e.g., the position opposite to the track on which there is recorded the audio signal corresponding to the music head (beginning portion) of music that user has designated by a music select button (not shown) of the operation section 9.

This optical pick-up 21 comprises an object lens (objective) 21a, an actuator 21b, and laser diode, beam splitter and photo-detector which are not shown, etc. Laser beams emitted from the laser diode are guided to the object lens 21a through the beam splitter, and are converged onto a point on the CD1 by the object lens 21a. A quantity of reflected light which returns to the object lens 21a of a reflected light of the converged laser beams changes in dependency upon the presence or absence of pits on the track of the CD1. The photo-detector provided at the optical pick-up 21 successively reads out changes of the quantity of reflected light through the beam splitter to deliver, to the RF amplifier, RF signals corresponding to the changes of the quantity of reflected light.

The RF amplifier 3 reproduces data as described above, and generates, on the basis of the reflected light from the CD1, a focus error signal indicating positional shift (deviation) from the in-focus position of the object lens 21a and a tracking error signal indicating positional shift (deviation) with respect to the corresponding track of spot of laser beam to deliver the focus error signal and the tracking error signal to the servo circuit 22 through the system control section 8. The servo circuit 22 drives the actuator 21b so that the focus error signal and the tracking error signal become equal to zero to, e.g., drive the object lens 21a in the focus direction, or carry out access within the visual field, etc. to correct errors in the focus direction and in the tracking direction of the object lens 21a.

The operation of the loop reproduction of this optical disc reproducing apparatus will now be described with reference to FIG. 1 and FIGS. 2A to 2D.

The system control section 8 comprises, as shown in FIG. 1, a comparison circuit 8a for comparing the absolute address stored in memory section 10 which will be described later and the absolute address separated from reproduction data at the digital signal processing section 4 and extracted at the absolute time extraction section 7, a loop counter 8d for counting the number of loop reproduction operations, a calculating circuit 8b for calculating the time at which the loop reproduction is executed, and a control circuit 8c for controlling the servo circuit 22, etc. by an input signal from the operation section 9.

Further, the operation section 9 comprises, as shown in FIG. 1, a loop reproduction switch 9a for designating (instructing) loop reproduction, a loop reproduction mode select switch 9b for selecting mode of the loop reproduction and a loop level select switch 9c for selecting loop level which will be described later, and the above mentioned reproduction button, temporary stop button and music select button (not shown), etc.

Figure 2A:
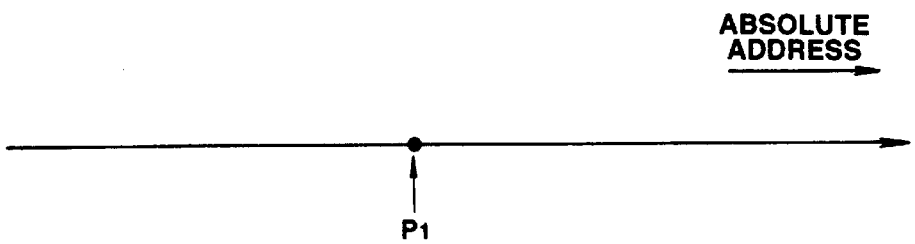
FIG. 2A is a view showing, on the time axis, storage operation of the absolute address at the time of starting of loop reproduction.

When the loop reproduction switch 9a provided at the operation section 9 is pushed down by user, loop reproduction command signal is delivered to the control circuit 8c for a time period during which user pushes down the loop reproduction switch 9a. At this time, as shown in FIG. 2A, the control circuit 8c allows the memory section 10 to store, through the comparison section 8a, absolute address corresponding to the position $P_1$ extracted at the absolute address extraction section 7 when the loop reproduction switch 9a is pushed down by the user.

Figure 2B:
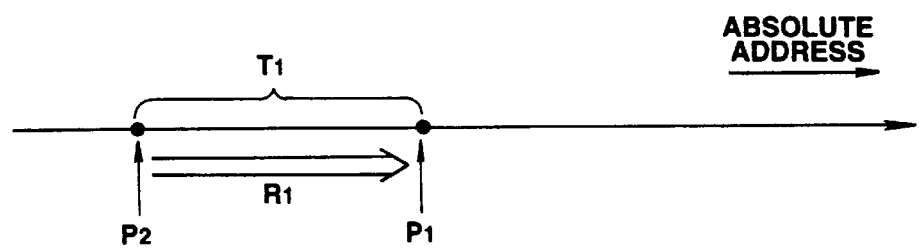
FIG. 2B is a view showing, on the time axis, track jump at the time of loop reproduction.

Further, the control circuit 8c sends a signal to the servo circuit 22 to drive the actuator 21b to allow the object lens 21a to provide, e.g., an access within the visual field to move spot of laser beam in the inner circumferential direction of the CD1 until a predetermined track, i.e., to the position $P_2$ traced back by the time $T_1$ in regard to data of music as shown in FIG. 2B (such an operation will be called track jump hereinafter) to start the ordinary read-out operation $R_1$ for a second time from that position.

When such read-out operation $R_1$ is being carried out, the comparison circuit 8a compares absolute addresses of data sequentially read out from the CD1 and absolute address at the time when the loop reproduction switch 9a is pushed down (turned ON) stored in the memory section 10 to deliver a signal indicating coincidence to the control circuit 8c when the both addresses are coincident with each other. The control circuit 8c delivers a signal to the servo circuit 22 for a second time on the basis of this signal to drive the actuator 21b to allow the object lens 21a to provide, e.g., access within the visual field to carry out such a track jump to move spot of laser beam to the Position $P_2$ traced back by time $T_1$ in the inner circumferential direction of the CD1. Such an operation is repeatedly carried out for a time period during which the loop reproduction switch 9a is pushed down by the user.

It is to be noted that when carrying out a track jump, this CD player reproduces sound based on the audio signal that the optical pick-up 21 has read at the time of the track jump as it is without muting reproduction sound. As a result, sound in noise form is outputted at the time of loop reproduction.

On the other hand, the loop reproduction mode select switch 9b is provided for permitting user to select any one of two modes of the normal mode and the rhythm mode which determine reproduction starting position at the time when the loop reproduction is completed. Setting of the normal mode/rhythm mode is carried out by ON/OFF of the loop reproduction mode select switch 9b.

Figure 2C:
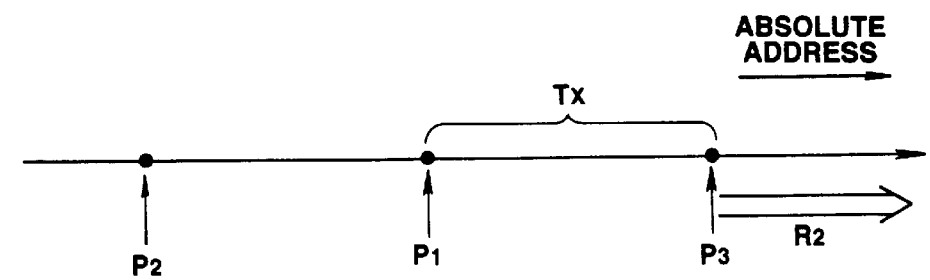
FIG. 2C is a view showing, on the time axis, operation of the rhythm mode in the loop reproduction.

In this case, in the rhythm mode, time from the start to the end of the loop reproduction (hereinafter referred to as loop reproduction execution time) is calculated at the time point when the loop reproduction is completed to start the ordinary reproduction from the position where address quantity corresponding to the loop reproduction execution time is added to the absolute address $P_1$ from which the loop reproduction is started. For example, when the loop reproduction execution time is assumed to be $T_x$, the read-out operation $R_2$ at the time when the loop reproduction is completed in the rhythm mode is started, as shown in FIG. 2C, from the position $P_3$ where address quantity corresponding to the reproduction execution time $T_x$ is added to the absolute address corresponding to the position $P_1$.

Thus, the beat before the loop reproduction is started and the beat after the loop reproduction is completed can be matched with each other. Namely, the ordinary musical piece has beats repeated by predetermined intervals in point of time. Employment of the rhythm mode can prevent that timing between the beat before the loop reproduction is started and the beat restarted at the time when the loop reproduction is completed is from being shifted in point of time.

Figure 2D:
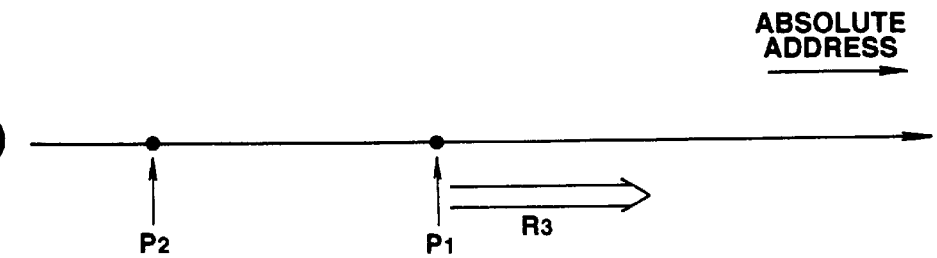
FIG. 2D is a view showing, on the time axis, operation of the normal mode in the loop reproduction.

On the other hand, in the normal mode, as shown in FIG. 2D, the ordinary reproduction is started from the position $P_1$ indicated by the absolute address where the loop reproduction is started at the time when the loop reproduction is completed irrespective of the loop reproduction execution time. In the scratch rendition using a record disc of the analog system, ordinarily, at the time when the scratch rendition is completed, reproduction by ordinary rotation is carried out from the position where the user allows his hand to be away from the record disc. It can be said that this normal mode is the mode close to the scratch rendition using the record disc of the analog system.

The loop reproduction operation of this CD player will now be described in detail with reference to the flowchart of FIG. 3.

The memory section 10 is composed of, e.g., ROM and RAM. In the ROM, there are stored in advance, in addition to the program for carrying out the ordinary reproduction operation of the CD player, data of the loop level indicating the number of tracks for carrying out track jump at the time of loop reproduction, a program of the loop mode indicating the reproduction operation after the loop reproduction is completed, and the like.

In this embodiment, the loop level is set to five stages of 1 to 5. The level 1 indicates track jump corresponding to 2 tracks, the level 2 indicates track jump corresponding to 4 tracks, the level 3 indicates track jump corresponding to 6 tracks, the level 4 indicates track jump corresponding to 8 tracks, and the level 5 indicates track jump corresponding to 10 tracks. In this case, e.g., the time corresponding to 2 tracks of the level 1 is about 0.1 to 0.5 sec. in terms of the reproduction time, and the time corresponding to 10 tracks corresponding to the maximum level 5 is about 1.0 to 1.5 sec. in terms of the reproduction time. Prior to execution of the loop reproduction the, user sets the loop level, e.g., by the number of pushing-down operations of the loop level select switch 9c by means of the loop level select switch 9c.

Figure 3:
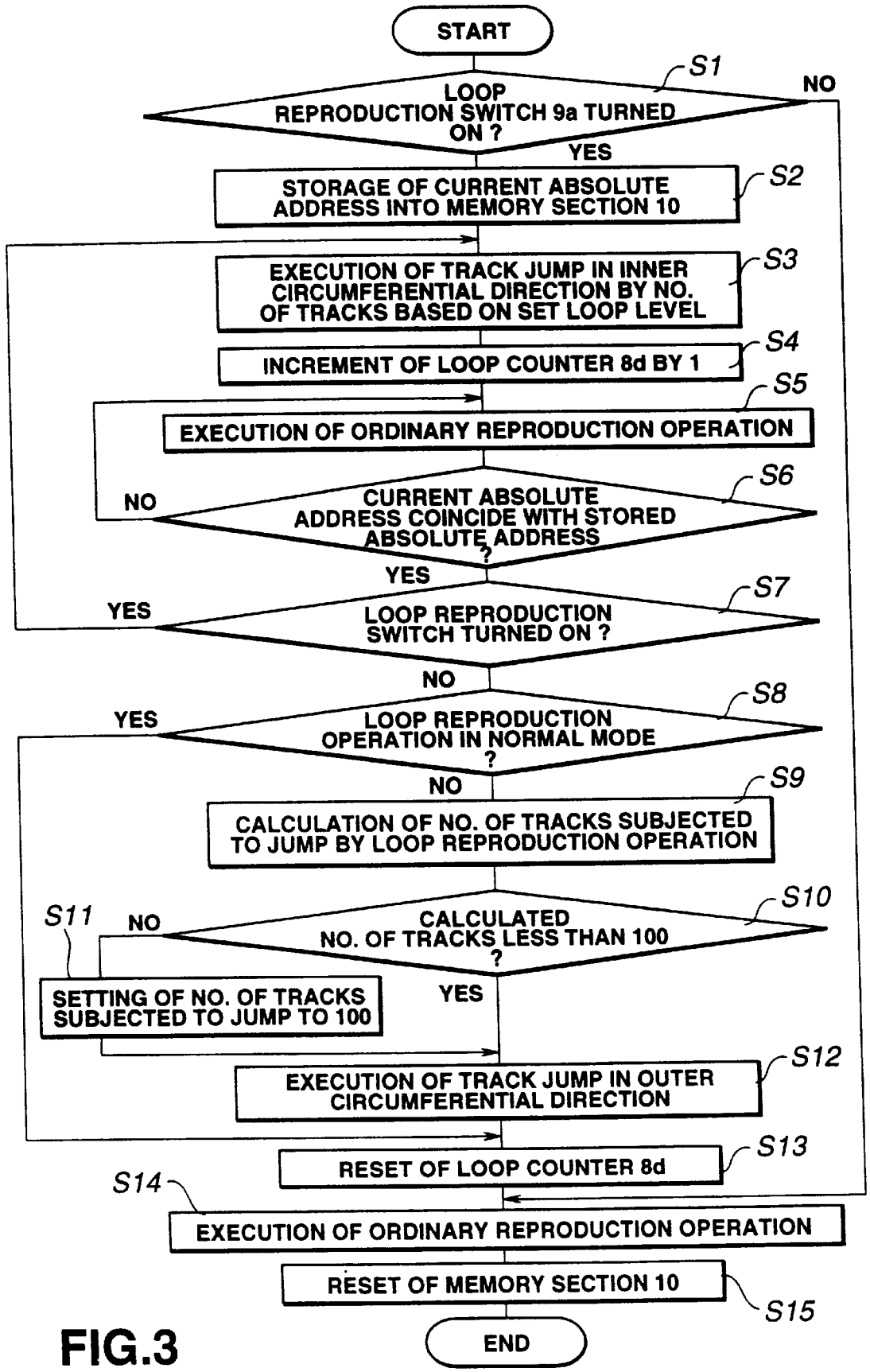
FIG. 3 is a flowchart showing operation at the time of loop reproduction of the CD player to which this invention is applied.

As shown in the flowchart of FIG. 3, at step S1 of the first step, the control cicuit 8c judges whether or not the loop reproduction switch 9a is pushed down (turned ON). If so, the processing operation proceeds to step S2. If not so, the processing operation proceeds to step S14. Thus, the ordinary reproduction operation is carried out.

At the step S2, the control circuit 8c allows the RAM of the memory section 10 to store thereinto the absolute address delivered from the absolute address extraction section 7 to the comparison circuit 8a. Moreover, in the memory section 10, as described above, there are stored information of mode of loop reproduction and loop level set in advance the that user sets in advance by using the loop reproduction mode select switch 9b and the loop level select switch 9c.

At step S3, the control circuit 8c delivers a signal corresponding to the loop level stored in the memory section 10 to the servo circuit 22 to drive the actuator 21b to allow the object lens 21a to carry out access within the visual field to move the spot of laser beam in the inner circumferential direction by the number of tracks corresponding to the set loop level. Then, the processing operation by the control circuit 8c proceeds to step S4. At the step S4, the control circuit 8c increments the loop counter 8d by 1. Thus, the processing operation proceeds to step S5 to carry out the ordinary reproduction operation.

At step S6, the comparison circuit 8a successively compares absolute address stored in the memory section 10 at the step S2 and the absolute addresses extracted at the absolute time extraction section 7 to deliver a signal indicative of coincidence when both addresses coincide with each other to the control circuit 8c. The control circuit 8c judges whether or not the signal indicating that these two absolute addresses coincide with each other is delivered from the comparison circuit 8a. If not so, the processing operation returns to the step S5. If so, the processing operation proceeds to step S7.

At the step S7, the control circuit 8c judges whether or not the loop reproduction switch 9a is continuously pushed down (turned ON). If so, the processing operation returns to the step S3. If not so, the processing operation proceeds to step S8. Namely, the processing from the step S3 to the step S7 is repeatedly executed for a time period during which the user pushes down the loop reproduction switch 9a.

At the step S8, the control circuit 8c judges whether or not the loop mode is the normal mode. This loop mode is set in advance by using the loop reproduction mode select switch 9b before start of the loop operation by user as previously described. If result of this judgment is YES, i.e., the loop mode is the normal mode, the processing operation by the control circuit 8c proceeds to step S13. In contrast, if the result of this judgment is NO, i.e., the loop mode is the rhythm mode, the processing operation by the control circuit proceeds to step S9.

At the step S9, the calculating circuit 8b carries out multiplication of the number of tracks corresponding to one track jump set by the loop level and the number of loops counted by the loop counter 8d to thereby calculate the total number of tracks in which the track jump has been carried out by the loop reproduction to deliver the result thus obtained to the control circuit 8c. When, e.g., five track jump operations are carried out at the level 3, the number of tracks corresponding to one track jump becomes equal to 6, and the total number of tracks becomes equal to 30 (=5×6).

At step S10, the control circuit 8c judges whether or not the total number of tracks in which the track jump is carried out, which has been calculated at the step S9, is less than 100. If the result of this judgment is NO, i.e., the total number of tracks in which the track jump is carried out is equal to 100 or more, the processing by the control circuit 8c proceeds to step S11. In contrast, if the result of the judgment is YES, i.e., the total number of tracks where the track jump is carried out is less than 100, the processing operation by the control circuit 8c proceeds to step S12. At the step S11, the control circuit 8c sets the number of tracks required for carrying out the track jump to 100. Thus, the processing operation proceeds to step S12.

At the step S12, the control circuit 8c sends a signal to the servo circuit 22 on the basis of the total number of tracks calculated by the calculating circuit 8b at the step S9 or the total number of tracks set at the step S11 to control the servo circuit 22 to drive the actuator 21b to move the laser beams in the outer circumferential direction by the total number of tracks. Namely, reproduction operation $R_2$ from the position $P_3$ shown in the FIG. 2C mentioned above is carried out.

The reason why the maximum number of track jump operations is set to 100 is to prevent the situation where the ordinary reproduction is restarted at the time when the loop reproduction is completed becomes unknown in the case where loop reproduction is carried out for a long time in the rhythm mode. The 100 tracks correspond to about 20 seconds in terms of the reproduction time. In addition, this maximum number of track jump operations can be arbitrarily changed.

At step S13, the control circuit 8c resets the loop counter 8d to 0. Thus, the processing operation proceeds to step S14 to start the ordinary reproduction operation. Namely, in the case where the processing operation proceeds from the above-described step S8 directly to the step S13, the control circuit 8c carries out the ordinary reproduction operation $R_3$ from $P_1$ of FIG. 2D.

At step S15, the control circuit 8c erases data of the absolute addresses stored in the memory section 10.

As stated above, in the rhythm mode, this CD player carries out a track jump toward the outer circumference from the position where the loop reproduction is started by the total number of tracks in which track jump is carried out by the loop reproduction at the time when loop reproduction is completed to start reproduction. It is to be noted that, at the calculating circuit 8b or the control circuit 8c, the total number of tracks may be converted into loop reproduction execution time to restart the ordinary reproduction from the position (location) of the absolute address obtained by adding an address quantity corresponding to the loop reproduction execution time to the absolute address where the loop reproduction is started at the time of completion of the rhythm mode.

Thus, this CD player outputs sounds reproduced while repeating a track jump at the time of loop reproduction, thereby making it possible to provide effects similar to reproduction sound obtained by the scratch rendition by the recording disc of the analog system.

Further, in the CD player, since the disc and the non-contact type pick-up are used, there also does not result the problem such as abrasion of the record disc in the scratch by the record player of the analog system. In addition, use of the above-described rhythm mode can easily realize matching between the beat before starting of the loop reproduction and the beat after completion of the loop reproduction which inevitably relied upon the performance ability of user in the scratch rendition by the record disc.

It is to be noted that this invention is not limited to the above-described embodiment. For example, while the number of tracks where a track jump is carried out is set to 10 tracks at the maximum in this embodiment, a larger number of tracks may be caused to go back. In that case, an approach is employed, in addition to driving the object lens 21a by the actuator 21b, to move the optical pick-up 21 in the inner circumferential direction by the sled feed motor 24.

Further, if, e.g., there is employed an approach in which, in carrying out a track jump in accordance with a designated loop level at the time of loop reproduction, when the absolute address of the position traced back in point of time is stored into the memory section 10 to carry out the track jump, higher and more precise loop reproduction can be carried out.

Furthermore, while, e.g., the time period during which the loop reproduction switch 9a is pushed down by the user is set to the loop reproduction time period in this embodiment, start and end of the loop reproduction may be carried out by respective single push-button operations.

In addition, while, in the above-described embodiment, explanation has been given by using the CD player to which this invention is applied, it is needless to say that this invention can be applied to disc player using, e.g., magneto-optical disc, etc. as a recording medium.

INDUSTRIAL APPLICABILITY

In this invention, in an optical disc reproducing system for irradiating laser beams onto the optical disc on which audio signals and absolute address data are recorded in spiral form or in concentric form in a manner focused on a point thereon to read out data recorded on the optical disc by a reflected light thereof, such an operation is repeated to allow memory means to store absolute address data thereinto when setting of the loop reproduction is carried out to start read-out operation from a position traced back in point of time of the audio signal to move the laser beams of the read-out means to the position traced back in point of time for a second time at the time when the absolute address thus read out coincides with the absolute address stored in the memory means, thus to carry out reproduction of the optical disc.

Thus, the optical disc on which audio signals are recorded is used, thereby making it possible to provide the effects similar to the scratch rendition by the record disc of the analog system and the record player.

We claim:

1. An optical disc reproducing apparatus adapted for irradiating laser beams onto an optical disc on which audio signals and absolute address data are recorded in one of a spiral form and in a an outer circumference to read a reflected light thereof and thereby to reproduce the audio signals and absolute address data, the apparatus comprising:
data read-out means for reading out the audio signals and absolute address data and including an object lens for converging the laser beams onto a point on the optical disc and an actuator for moving the object lens in a direction parallel to the optical axis of the laser beams and in a radial direction of the disc;
memory means for storing the absolute address data which have been read out from the optical disc by the readout means; and
control means operative so that when setting of a loop reproduction is carried out the memory means stores the absolute address data and the control means controls the actuator to move the laser beams in the inner circumferential direction to start a read-out operation by the read-out means from a position traced back in time in the audio signal to move the laser beams to the position traced back in time for a second time at the time point when an absolute address defined by the absolute address data thus read out becomes in correspondence with the absolute address defined by the absolute address data stored in the memory means.

2. The optical disc reproducing apparatus as set forth in claim 1,
wherein the control means controls the actuator for a time period during which the setting of the loop reproduction is made to repeatedly move the laser beams within a range from the position traced back in time to a position corresponding to the absolute address defined by the absolute address data stored in the memory means.

3. The optical disc reproducing apparatus as set forth in claim 1,
wherein the control means controls the actuator so that when the setting of the loop reproduction is released, the control means starts the read-out operation by the read-out means from the absolute address defined by the absolute address data stored in the memory means.

4. The optical disc reproducing apparatus as set forth in claim 1,
wherein the control means is operative so that when the setting of the loop reproduction is released, the read-out operation by the read-out means is started from a position where an address quantity corresponding to a predetermined time is added to the absolute address defined by the absolute address data stored in the memory means and the control means controls the actuator so as to start the read-out operation by the read-out means from the position where the address quantity corresponding to the predetermined time is added.

5. The optical reproducing apparatus as set forth in claim 4,
wherein the control means comprises calculation means for calculating a time during the loop reproduction, whereby the control means controls the actuator so that when the setting of the loop reproduction is released, it starts the read-out operation by the read-out means from a location where the address quantity corresponding to a time that the calculation means has calculated is added to the absolute address.

6. The optical disc reproducing apparatus as set forth in claim 5,
wherein the calculation means calculates the time reproduced by the loop reproduction on the basis of a number of tracks corresponding to one loop reproduced during the loop reproduction and a number of execution operations of the loop reproduction.

7. An optical disc reproducing method for reproducing data from an optical disc on which audio signals and absolute address data are recorded in one of a spiral form and in a concentric form, the method comprising:
a step of irradiating laser beams onto the optical disc in a manner focused onto a point thereon to read out, by a read-out system using a reflected light from the optical disc, the audio signals and absolute address data recorded on the optical disc; and a step of, when setting of loop reproduction is carried out, causing a memory to store the absolute address data and to start a read-out operation from a position traced back in time of the read-out audio signal to move the laser beams of the read-out system to the position traced back in time for a second time when the absolute address defined by the absolute address data read out becomes in correspondence with the absolute address defined by the absolute address data stored in the memory means.

8. The optical disc reproducing method as set forth in claim 7, further comprising a step of controlling an actuator so that when the setting of the loop reproduction is released, the read-out operation by the read-out system is started from the absolute address defined by the absolute address data stored in the memory.

9. The optical disc reproducing method as set forth in claim 7, further comprising a step of controlling an actuator so that when the setting of the loop reproducing is released, the read-out operation by the read-out system is started from a position where an address quantity corresponding to a predetermined time is added to the absolute address defined by the absolute address data stored in the memory, and when the setting of the looper reproduction is released, the read-out operation by the read-out system is started from the position in which the address quantity corresponding to the predetermined time is added to the absolute address defined by the absolute address stored in the memory.

10. The optical disc reproducing method as set forth in claim 9, further comprising a step of calculating a time during the loop reproduction to control the actuator so as to start the read-out operation by the read-out system from a position in which an address quantity corresponding to a calculated time is added to the absolute address defined by the absolute address stored in the memory when the setting of the loop reproduction is released.

11. The optical disc reproducing method as set forth in claim 10, further comprising a step of calculating the time during the loop reproduction on the basis of a number of tracks corresponding to one loop reproduced by the loop reproduction and a number of execution operations of the loop.

12. An optical disc reproducing method for reproducing data from an optical disc on which audio signals and absolute address data are recorded in one of a spiral form and in a concentric form, the method including:

a step of irradiating laser beams onto the optical disc in a manner focused on a point thereon to read out, by using a read-out system, the audio signals and the absolute address data recorded on the optical disc by a reflected light from the optical disc;

a step of, when setting of loop reproduction is carried out, causing a memory to store the absolute address data thereinto and starting a read-out operation by the read-out system from a position traced back in time of the audio signal;

a step of moving the laser beams of the read-out system to the position traced back in time for a second time when an absolute address defined by the absolute address data thus read out becomes in correspondence with an absolute address defined by the absolute address data stored in the memory during setting of the loop reproduction to repeatedly carry out the read-out operation; and a step of, when the setting of the loop reproduction is released, selecting any one of the stored absolute address and a position in which an address quantity corresponding to a predetermined time is added to the stored absolute address to start the readout operation.

13. The optical disc reproducing method as set forth in claim 12, further comprising a step of calculating a time during which the loop reproduction is carried out.

14. The optical disc reproducing method as set forth in claim 13, wherein the step of calculating the time during which the loop reproduction is carried out is carried out on the basis of counting a number of tracks corresponding to one loop reproduced by the loop reproduction and a number of execution operations of the loop.

* * * * *